(12) United States Patent
Trinel et al.

(10) Patent No.: US 12,358,829 B2
(45) Date of Patent: Jul. 15, 2025

(54) METHOD FOR MANUFACTURING A PREFORM FOR A MULTI-CORE OPTICAL FIBER AND METHOD FOR MANUFACTURING MULTI-CORE OPTICAL FIBERS

(71) Applicant: Draka Comteq France, Paron (FR)

(72) Inventors: Jean-Baptiste Trinel, Paron (FR); Pierre Sillard, Paron (FR); Alain Giuliani, Paron (FR); Pierre Rebreyend, Paron (FR); Maryna Kudinova, Paron (FR)

(73) Assignee: Draka Comteq France, Paron (FR)

( * ) Notice: Subject to any disclaimer, the term of this patent is extended or adjusted under 35 U.S.C. 154(b) by 356 days.

(21) Appl. No.: 17/834,187

(22) Filed: Jun. 7, 2022

(65) Prior Publication Data
US 2022/0402803 A1    Dec. 22, 2022

(30) Foreign Application Priority Data
Jun. 15, 2021   (FR) ........................................ 2106316

(51) Int. Cl.
   *C03B 37/012*       (2006.01)
(52) U.S. Cl.
   CPC .............................. *C03B 37/01222* (2013.01)
(58) Field of Classification Search
   CPC ............................................... C03B 37/01228
   See application file for complete search history.

(56) References Cited

U.S. PATENT DOCUMENTS

| | | | |
|---|---|---|---|
| 6,196,028 B1* | 3/2001 | Humbert | C03B 33/085 65/483 |
| 6,584,808 B1* | 7/2003 | Roba | C03B 37/02754 65/412 |
| 6,711,333 B2 | 3/2004 | West | |
| 2006/0245705 A1* | 11/2006 | Hirano | G02B 6/03611 385/123 |
| 2007/0289332 A1* | 12/2007 | Petitfrere | C03B 37/01291 65/421 |
| 2009/0078006 A1* | 3/2009 | Cuvelier | C03B 37/01205 65/391 |
| 2010/0008634 A1* | 1/2010 | Guertin | C03B 37/01222 65/402 |
| 2012/0114292 A1* | 5/2012 | Hoover | C03B 37/027 385/124 |

(Continued)

FOREIGN PATENT DOCUMENTS

| | | | | |
|---|---|---|---|---|
| JP | 2015178444 A | * | 10/2015 | ....... C03B 37/01205 |
| JP | 6681306 B2 | | 4/2020 | |

(Continued)

*Primary Examiner* — Lisa L Herring
(74) *Attorney, Agent, or Firm* — Shumaker, Loop & Kendrick, LLP

(57) ABSTRACT

A method for manufacturing a preform for a multicore fiber, including stacking (S1) a plurality of core rods and a plurality of silica-based filler rods in a tube; collapsing (S2) the tube around the stack of core rods and silica-based filler rods, forming a collapsed stack; depositing (S3) a layer of silica around the collapsed stack; removing (S4) at least part of the deposited layer of silica. The preferential process for depositing a layer of silica around the collapsed stack and removing at least part of the deposited layer of silica is Advanced Plasma and Vapor Deposition.

13 Claims, 7 Drawing Sheets

(56) References Cited

U.S. PATENT DOCUMENTS

| | | | |
|---|---|---|---|
| 2014/0216109 A1* | 8/2014 | Ishida | C03B 37/02754 65/409 |
| 2015/0055923 A1* | 2/2015 | Saito | G02B 6/2555 65/378 |
| 2018/0145752 A1* | 5/2018 | Ma | G01B 11/08 |

FOREIGN PATENT DOCUMENTS

| | | | | |
|---|---|---|---|---|
| WO | 00/16131 A2 | 3/2000 | | |
| WO | WO-2003004426 A | * | 1/2003 | C03B 37/01228 |

\* cited by examiner

METHOD FOR MANUFACTURING A PREFORM FOR A MULTI-CORE OPTICAL FIBER AND METHOD FOR MANUFACTURING MULTI-CORE OPTICAL FIBERS

TECHNICAL FIELD

The present disclosure relates to a method for manufacturing a preform for a multicore optical fiber and a method for manufacturing a multicore optical fiber. The present disclosure also relates to the multicore optical fibers manufactured according to these methods.

BACKGROUND

Nowadays, optical fibers have established themselves as the most suitable medium for the transmission of data communication signals. They are widely used in most telecommunication systems, and allow the high-speed communication of data signals at high bandwidths. To this purpose, optical fibers comprise a core, which outer circumference is surrounded by a cladding: information is transmitted by propagating an optical signal in the core.

In recent years, there has been a need to strongly increase the amount of information to be transmitted, as well as the transmission speed.

To fulfill this purpose, multi-core optical fibers were designed, in which a plurality of cores are surrounded by a single cladding: a plurality of signals can hence be transmitted simultaneously in a single optical fiber, by the light propagating through the respective cores.

The most common method for manufacturing a multicore fiber is known as the stack-and-draw method. It consists in precisely assembling several rods in a tube, namely several core rods, which will serve as the cores in the final fiber, and several stacking rods, which will form the cladding in the final fiber. These rods of two different glasses are stacked together into a macrostructure called a multi-rod preform. Then, using a fiber drawing tower, this multi-rod preform is slowly pulled through a high-temperature furnace to scale it down in size. This drawing step should be pressure controlled to close the gaps between the rods, and avoid undesired occurrence of bubbles, air-clads, etc. Throughout the stacking and closing steps of this stack-and-draw process, care must also be taken to guarantee the geometric design (core positions, core sizes) and the overall preform geometry (ovality, diameter stability along length, beating . . . ).

A drawback of this stack-and-draw manufacturing method is that it provides fibers with high non-circularity. Moreover, the stack-and-draw process provides limited possibilities to control the diameters of the cores and core-to-core distance in the multi-core fiber. Actually, the stack-and-draw manufacturing method induces constraints on the multi-core preform design:

The stack dimensions are limited by the tube dimensions, particularly the stack outer diameter is limited by the tube inner diameter.

The core diameter in the final fiber is defined by the tube outer diameter.

The core-to-core distance is constrained by the tube thickness. For a given design, the thicker the tube is, the lower the (maximum achievable) core-to-core distance is. Typically for a 125 µm fiber cladding diameter, with a tube of 4 mm thickness, maximum core-to-core distance achievable is 40 µm.

The tube thickness must have a minimum value to perform a collapse process.

Typically, a tube width of ~4-7 mm is mandatory.

Controlling the geometry of the multicore fiber with a stack-and-draw process implies using many stacking rods, which is expensive, and makes it difficult to assemble the stack.

Patent document US2014/0216109 describes a method for manufacturing multicore fibers with an improved stack-and-draw process.

A plurality of core rods and a plurality of clad rods are arranged in a clad tube, in a state in which distances between center axes of the adjacent core rods become equal to each other and a state in which parts of outer circumferential surfaces in the adjacent rods contact. The manufacturing method comprises an integration process for integrating the clad tube and the plurality of core rods and clad rods arranged in the tube. A ratio of a total cross-sectional area of a direction orthogonal to a length direction in the plurality of core rods and the plurality of clad rods with respect to an internal cross-sectional area of the tube of a direction orthogonal to a length direction in the clad tube is 0.84 or more.

A drawback of this solution, however, is that the outer diameter of the preform is not circular and may present small dips/deformations. Also, the outer diameter is not very stable along the length of the preform, depending on the rod straightness and outer diameter stability along their lengths.

Alternate solutions to manufacture multicore optical fibers were also discussed in the prior art.

Patent document US2012/0114292 describes methods for making multi-core optical fiber ribbons: glass is deposited around a core cane assembly with planar arranged cores to form a rectangular shaped multi-core fiber ribbon. In one embodiment, a multi-core optical fiber ribbon includes at least two core members formed from silica-based glass and oriented in parallel with one another in a single plane. A single cladding layer is formed from silica-based glass and surrounds and is in direct contact with the core members. The single cladding layer is substantially rectangular in cross section.

Patent document JP6681306 describes another manufacturing method, which consists in depositing glass around an assembly of core rods and dummy rods that is not arranged in a tube.

This manufacturing method includes: a fixing step of fixing, on at least one end of each of plural core coated rods, a large-diameter rod having larger outer diameter than each of the core coated rods, each core coated rod having an outer peripheral surface of a core rod as a core coated with a clad glass layer as a part of a clad; a bundling step of bundling the plural core coated rods together so that the large-diameter rods respectively fixed to the plural core coated rods are arranged adjacent to each other on side surfaces thereof; and an externally depositing step of depositing soot as the other part of the clad on an outer peripheral surface of the plural core coated rods.

A drawback of this method is that it is difficult to respect the geometric design, and the overall preform geometry during the bundling step.

It would hence be desirable to provide an improved method for manufacturing a preform for a multi-core optical fiber, and a method for manufacturing a multi-core optical fiber. Notably, it would be desirable to provide such a manufacturing method which allows manufacturing multi-core fibers with improved circularity with respect to the prior art, and with better control of the diameters of the cores and core-to-core distances in the multi-core fiber.

SUMMARY

According to one embodiment, a method for manufacturing a preform for a multicore fiber, comprises:
  stacking a plurality of core rods and a plurality of silica-based filler rods in a tube, forming a stack of rods;
  collapsing the tube around the stack of rods, forming a collapsed stack;
  depositing a layer of silica around the collapsed stack; and
  removing at least part of the deposited layer of silica.

The method according to this embodiment thus relies on a novel and inventive approach for manufacturing a preform for a multicore fiber. Indeed, as compared with the improved stack-and-draw process described in patent document US2014/0216109, the method according to this embodiment relies on an additional over-cladding and removal (e.g. evaporation) cycle, which allows to obtain a circular outer diameter of the preform, and to achieve diameter stability along length. Moreover, it adds a degree of freedom to better control core-to-core distance within the preform, by adjusting the preform outer diameter to the desired value, and unlocking the tube thickness constraint. Such a method thus allows to guarantee and/or adjust the geometric design of the preform, after the stacking and collapsing steps, without using too many silica-based filler rods, which is cost-saving. While the outer diameter of the multi-core preform could be difficult to predict or control, due to the collapsing process, it may be easily adjusted thanks to the additional over-cladding and removal (e.g. evaporating) cycle.

In other words, as compared with the known prior art techniques, the manufacturing method according to this embodiment:
  releases the constraint on the core diameter within the final multicore fiber, which is no longer defined by the tube outer diameter, but rather by the final multicore preform outer diameter;
  releases the constraint on the core-to-core distance within the final multicore fiber, which is no longer constrained by the tube thickness, but is rather controlled by the final multicore preform outer diameter;
  releases the constraint on the tube thickness.

With appropriate tube dimensions, the method according to this embodiment allows to target multicore preforms of more than 50 mm outer diameter, and of ca. 1 m length.

According to an embodiment, such a method for manufacturing a preform for a multicore fiber also comprises removing at least part of the tube.

Preferably, collapsing the tube around the stack of rods comprises:
  cleaning the stack and inner part of the tube using $SF_6$;
  heating the cleaned tube at a temperature comprised between 1500° C. and 2000° C.; and
  closing the tube from one end to the other.

According to an embodiment, depositing a layer of silica around the collapsed stack is achieved using a process belonging to the group comprising:
  an Advanced Plasma and Vapor Deposition (APVD®) process;
  an Outside Vapor Deposition (OVD) process; and
  sleeving the collapsed stack with a silica glass tube.

According to an embodiment, removing at least part of the deposited layer of silica is achieved using a process belonging to the group comprising:

Evaporating with a plasma torch;
  Chemical etching;
  Mechanical machining;
  High pressure water etching; and
  High power laser etching.

In a preferred embodiment, however, both the over-cladding and evaporating steps are performed on a same APVD lathe.

In this case, prior to depositing a layer of silica around the collapsed stack, the method for manufacturing a multicore preform comprises a step for set-up of the collapsed stack on an APVD lathe, comprising:
  Placing two horizontally aligned handle rods within mandrels of the APVD lathe;
  Placing the collapsed stack on vertically adjustable positioning wheels supports located in close vicinity of both ends of the collapsed stack;
  Aligning a first end of the collapsed stack with a first handle rod;
  Rotating the collapsed stack at a rotation speed of 15 to 16 rpm around an axis of rotation aligned with the central axis of said handle rods;
  Heating the first end of the collapsed stack in contact with the first handle rod with a $O_2/H_2$ burner until limit of welding point temperature;
  Vertically adjusting both positioning wheels supports until the collapsed stack is centered on said axis of rotation, and
  Stopping the heating.

This peculiar process, which combines heating with a very slow rotation and a correct wheel support positioning during set-up of the collapsed stack, allows for straightening of the preform and reduction of beating, despite non-circularity of the collapsed stack.

Preferably, the plurality of core rods comprises 2 to 20 core rods.

Moreover, each core is either single-mode, few-mode or multimode.

According to an embodiment, the plurality of silica-based filler rods comprises at least two types of pure silica rods with distinct outer diameters. Preferably, these silica-based filler rods have an outer diameter smaller than the diameter of the core rods. Providing several types of silica-based filler rods with distinct outer diameters allows to form a stack of rods in which radial deviation of the core rods is reduced, and hence to better control the geometry of the multicore preform, notably as regards core-to-core distance.

According to an embodiment, the plurality of silica-based filler rods comprises one silica rod doped with fluorine, forming a marker rod.

According to another aspect of the present invention, there is provided a method for manufacturing a multicore fiber. The method comprises a drawing process for drawing the preform for the multicore fiber manufactured by the method for manufacturing the preform for the multicore fiber. According to one embodiment of this method for manufacturing a multicore fiber, the drawing process comprises a preform internal pressure control during draw. This allows better closing of air holes.

BRIEF DESCRIPTION OF THE DRAWINGS

The present disclosure can be better understood with reference to the following description and drawings, given by way of example and not limiting the scope of protection, and in which.

The components in the figures are not necessarily to scale, emphasis instead being placed upon illustrating the principles of the invention.

DETAILED DESCRIPTION OF EMBODIMENTS

The general principle of the invention relies on a novel and inventive approach for manufacturing a preform for a multicore optical fiber, according to which multiple core rods and clad rods are stacked in a glass tube, which is later collapsed. This collapsed stack undergoes an over-cladding and removal (e.g. evaporating) cycle, in order to achieve circularity of the preform.

Figure 1:
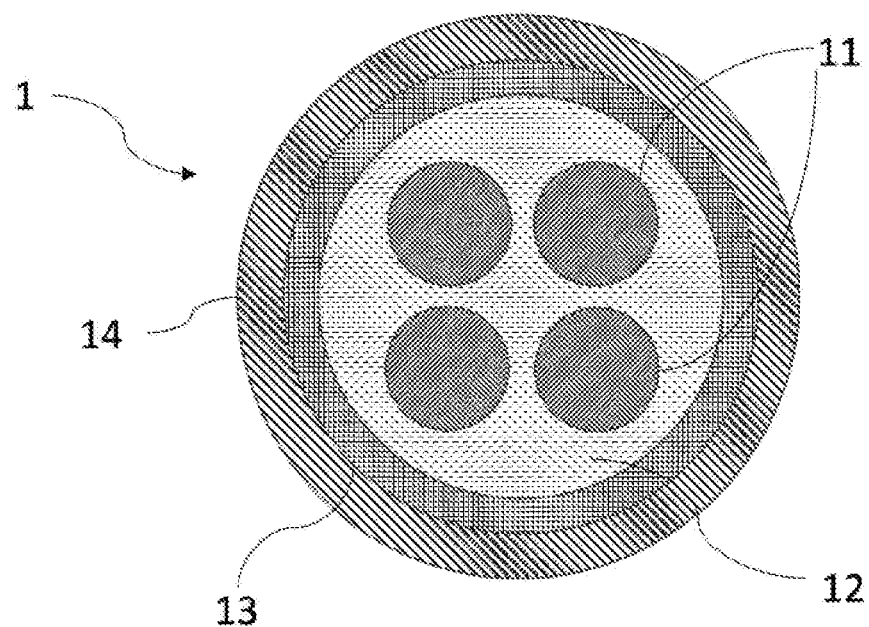
FIG. 1 depicts a cross-sectional view of a multicore optical fiber that is manufactured by a method of manufacturing a multicore fiber according to an embodiment of the invention.

FIG. 1 depicts a cross-sectional view of a multicore optical fiber that is manufactured by a method of manufacturing a multicore fiber according to an embodiment of the invention. As illustrated in FIG. 1, the multicore fiber 1 according to this embodiment includes a plurality of cores 11, a cladding 12 that surrounds and directly contacts the outer surfaces of the plurality of cores 11, a first protective coating layer 13 that covers the cladding 12, and a second protective coating layer 14 that covers the first protective layer 13. A refractive index of each core is higher than a refractive index of the cladding 12.

In the embodiment of FIG. 1, the multicore fiber 1 comprises four cores 11, which are arranged around a center axis of the cladding 12. Distances from the four cores to the center axis of the cladding are equal to each other. The core-to-core distance within the fiber may vary depending on the targeted use of the fiber. For an uncoupled multicore fiber, the targeted core-to-core distance in fiber 1 may vary between 35 μm and 45 μm. This distance may be reduced for a coupled multicore fiber.

In this embodiment, cores 11 may show any refractive index profile, and be step-index cores, or parabolic cores, or trapezoid cores, etc. Each of the cores 11 may also have a surrounding structure comprising one or several trench(es).

In other embodiments, the number of cores may vary from two to approximately twenty cores within the optical fiber 1.

The cores in the multicore optical fiber 1 may be single mode, few-mode or multimode.

Figure 2:
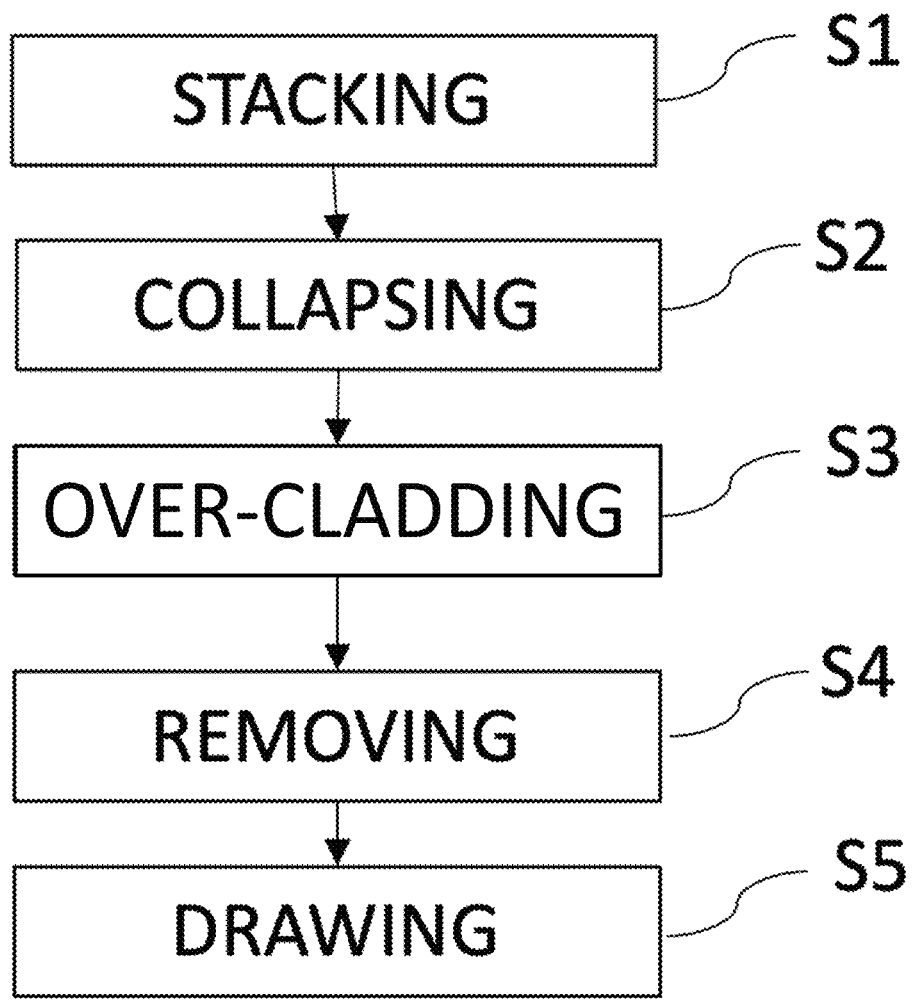
FIG. 2 is a flowchart illustrating the method of manufacturing the multicore fiber of FIG. 1 according to an embodiment of the invention.

FIG. 2 is a flowchart illustrating the method of manufacturing the multicore fiber 1 according to an embodiment of the invention. As illustrated in FIG. 2, the method of manufacturing the multicore fiber 1 according to this embodiment comprises:

Step S1 for stacking a plurality of core rods and a plurality of silica-based filler rods in a tube, forming a stack of rods;

Step S2 for collapsing the tube around the stack of rods, forming a collapsed stack;

Step S3 for depositing a layer of silica around the collapsed stack;

Step S4 for removing at least part of the deposited layer of silica, and optionally the tube, forming a preform;

Step S5 for drawing the preform.

Some or all of these steps may be performed in a clean room, under tight pressure control, notably stacking step S1 and drawing step S5.

Figure 3:
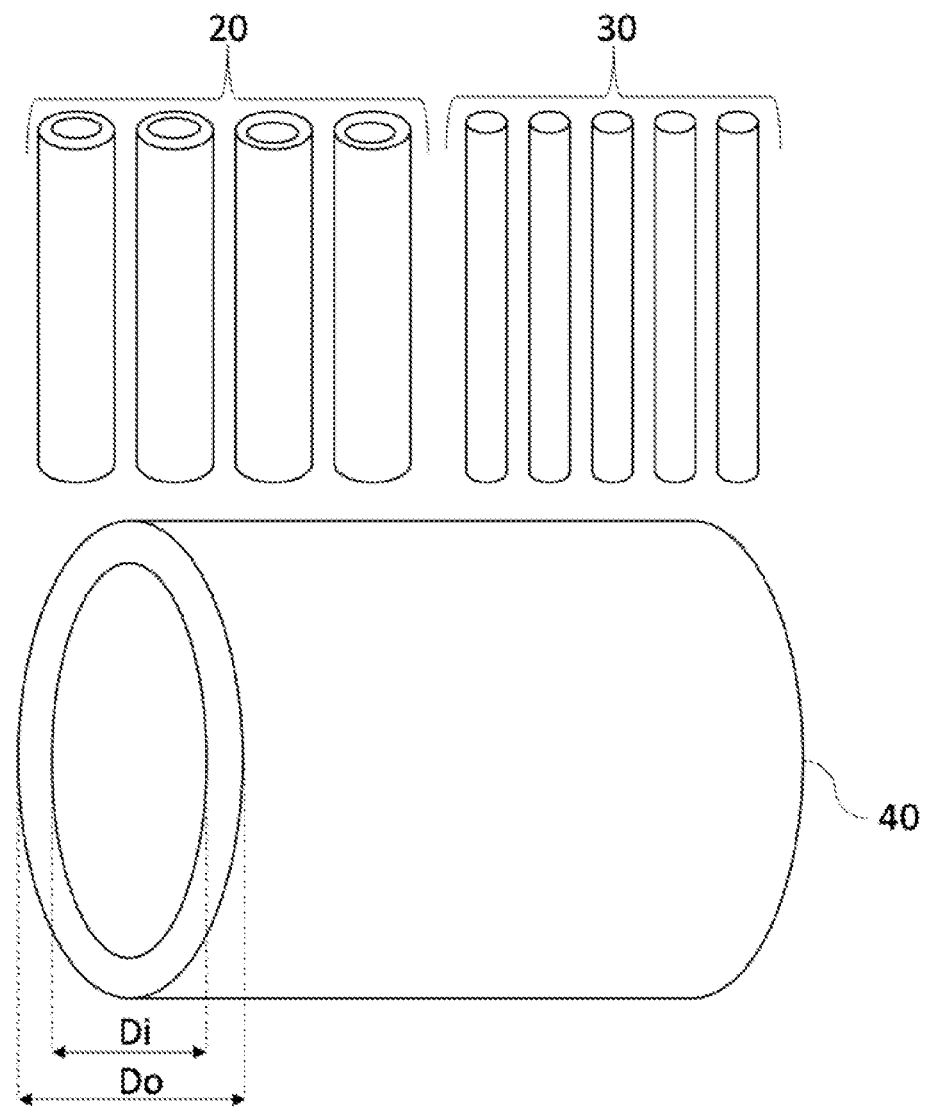
FIG. 3 shows the different elements (core rods, silica-based filler rods and glass tube) which are stacked together according to this embodiment.
Figure 4:
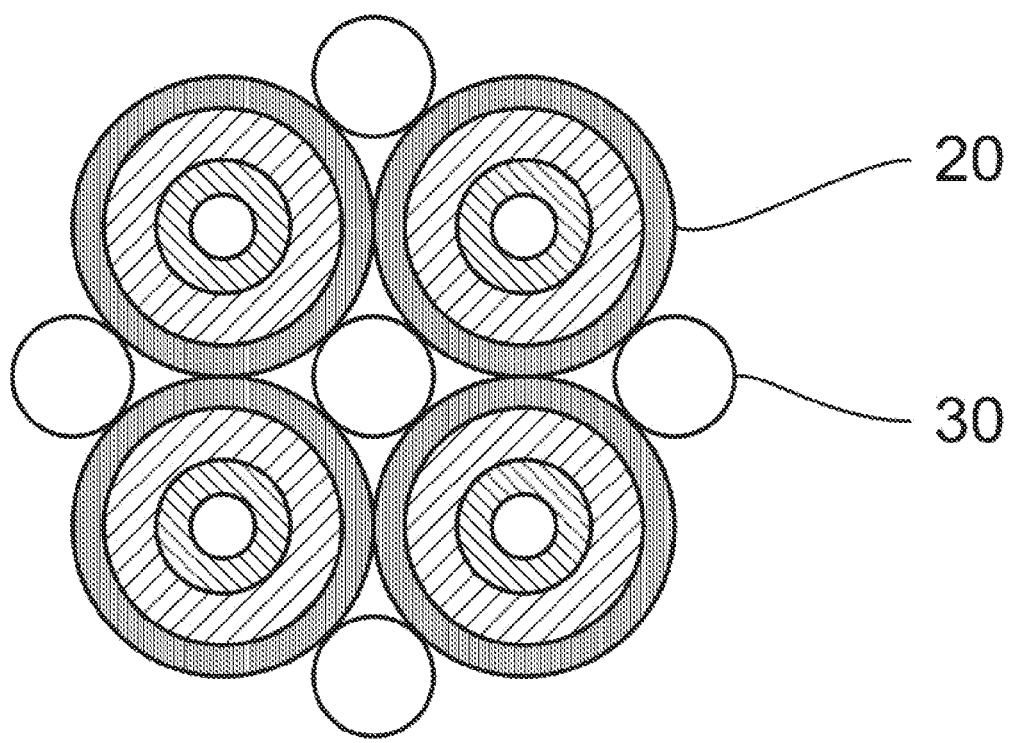
FIG. 4 shows the relative arrangement of the core rods and silica-based filler rods forming the stack according to this embodiment.
Figure 5:
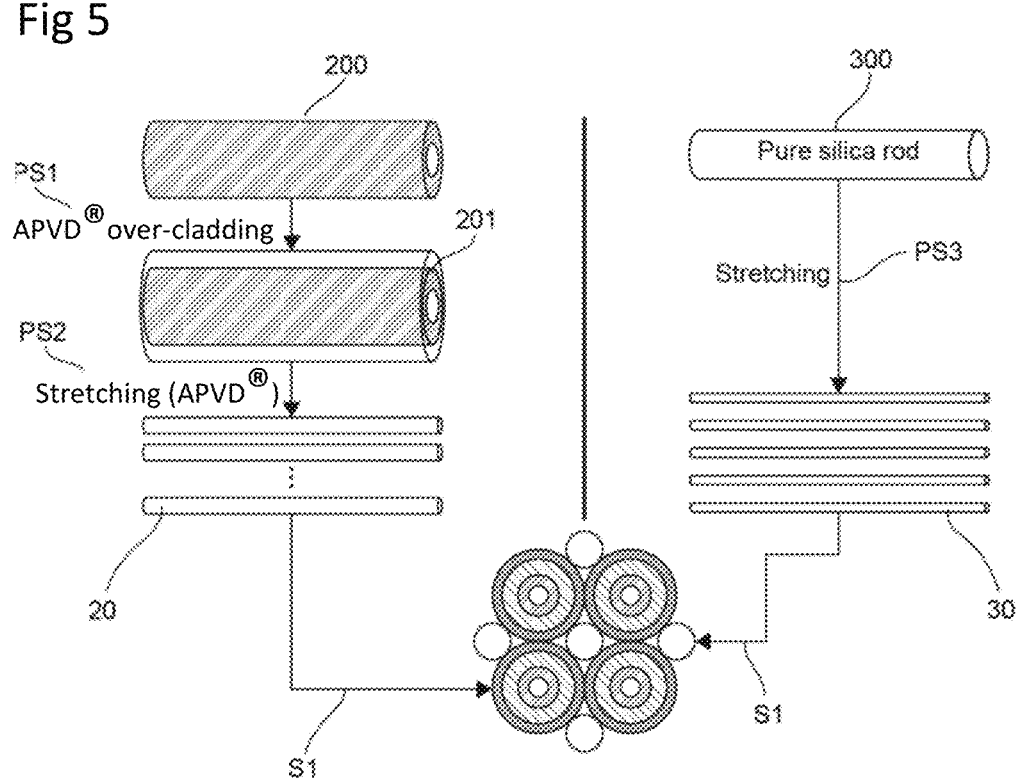
FIG. 5 illustrates the process for manufacturing the plurality of core rods and silica-based filler rods shown in FIGS. 3 and 4 according to this embodiment.

Stacking step S1 is described in greater details in relation to FIGS. 3 to 5.

FIG. 3 shows a plurality of core rods 20, a plurality of silica-based filler rods 30 and a glass tube 40 which will be arranged together during the stacking step S1.

In the embodiment of FIG. 3 and FIG. 4, four core rods 20 and five silica-based filler rods 30 are shown. Core rods 20 have for example a trapezoidal refractive index profile, with an inner part of the core rod having a constant refractive index, which is higher than the refractive index of pure silica, and a part surrounding the inner part of the core rod, in which the refractive index linearly decreases to reach that of pure silica, and an outer part with a refractive index equal to that of pure silica. The outer part of the core rods 20 may also comprise a region of depressed refractive index, as compared to that of pure silica, called a trench.

Filler rods 30 are made of pure silica and have an outer diameter of 5 mm. These four core rods 20 and five silica-based filler rods 30 are assembled according to the pattern shown in FIG. 4. The centers of core rods 20 form a square shape; two adjacent core rods contact each other on their outer surfaces. The core-to-core distance in the stack of FIG. 4 is equal to the outer diameter of a core rod 20. Five silica-based filler rods 30 form a cross, with a central silica-based filler rod located at the center of the square form formed by the core rods 20.

The stack of rods shown in FIG. 4 is assembled in a silica tube 40, with an inner diameter Di=36 mm and an outer diameter Do=48 mm. The thickness of tube 40 is hence 6 mm.

It must be noted that filler rods 30 can be doped or not. In practice, one would prefer rods matching refractive index of surrounding silica of tube 40. However, rods can be doped with Ge and/or F and/or P and/or B and/or any other appropriate dopant. As will be shown in relation to the embodiment of FIG. 8, it is also possible to use a F-doped rod 30 to add a marker to the structure.

FIG. 5 illustrates the process for manufacturing the plurality of core rods 20 and silica-based filler rods 30 shown in FIG. 3 and FIG. 4. The left hand part of FIG. 5 describes the process for manufacturing core rods 20, starting with a rod 200 showing the desired refractive index profile (e.g. a trapezoidal refractive index profile with a buried trench). Rod 200 may be manufactured with a PCVD (Plasma Chemical Vapor Deposition) process. Rod 200 undergoes an over-cladding step PS1, which is preferentially performed using an Advanced Plasma Vapor Deposition (APVD®) process, in order to form a rod 201, with an increased outer diameter. Rod 201 is a cylindrical member and has a two-layered structure, comprising the core element layer 200 and a clad element layer covering an outer circumferential surface of the core element layer 200.

Rod 201 undergoes a stretching step PS2, preferentially on an APVD lathe, in order to stretch rod 201 into a plurality of core rods 20 having each an outer diameter of 13.7 mm, and a length of ca. 1 m.

The right hand part of FIG. 5 describes the process for manufacturing silica-based filler rods 30, starting with a pure silica rod 300 with an outer diameter of 30 mm. Rod 300 is a cylindrical member and is formed of the same material as the clad element layer in core rod 201.

Rod 300 undergoes a stretching step PS3, in order to stretch rod 300 into a plurality of silica-based filler rods 30 having each an outer diameter of 5 mm, and a length of ca. 1 m.

During step S1, the plurality of core rods 20 and the plurality of silica-based filler rods 30 are stacked, according to the pattern of FIG. 4, and the stack is inserted in glass tube 40.

Next manufacturing step S2 consists in collapsing the tube at high temperature. The preferential range for this collapsing process S2 is 1500-2000° C.

According to a preferred embodiment, collapsing step S2 comprises:

A first phase for cleaning the stack using sulfur hexafluoride $SF_6$, which is important to avoid undesired formation of bubbles within the collapsed stack;

A second phase of heating, with an even temperature rise;

A third phase of closing the tube from one end to the other, thanks to both strong heating of the tube at 1500-2000° C. and putting it in vacuum.

This closing step is critical, as it is responsible for issues such as bubbles, air-clads, etc. and should be performed with care. It is possible to close the tube completely in one pass, without bubbles or air gaps, even with a limited number of filler rods. The manufacturing process according to this embodiment is hence economically advantageous as compared to a classical stack-and-draw process, as it uses a reduced number of filler rods and is hence less costly.

The collapsed stack which is obtained after the collapsing step S2 has a somewhat irregular outer diameter, of ca. 43 mm, which is not circular and may present small dips or deformations. Moreover, the outer diameter is not very stable along length, depending on rods straightness, and on rods outer diameter stability along length.

Figure 6:
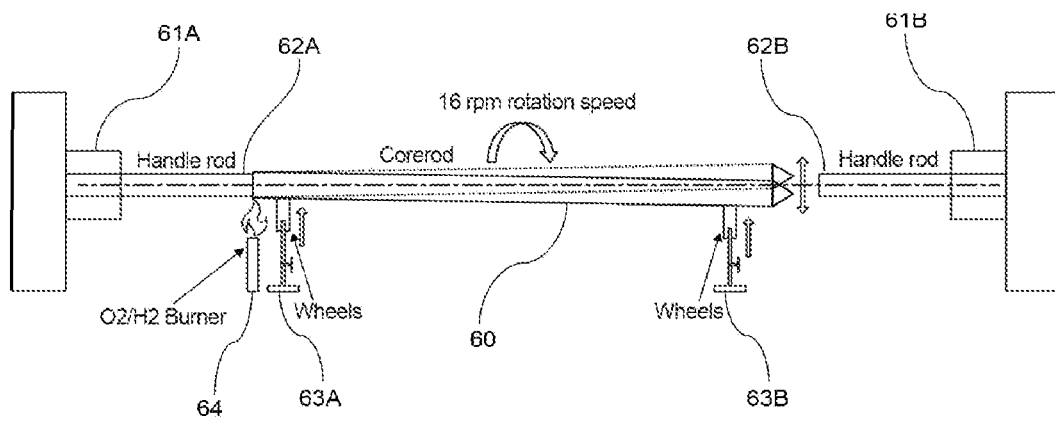
FIG. 6 is a schematic drawing illustrating the preform set-up on an APVD lathe according to this embodiment.

To correct these deficiencies, the manufacturing method according to this embodiment comprises an over-cladding S3 and removal (e.g. evaporating) S4 cycle. To perform this cycle, the preform 60 which is obtained after collapsing step S2 is first set up on an APVD lathe, as shown in FIG. 6. Two horizontally aligned handle rods 62A and 62B are placed within corresponding mandrels 61A and 61B of the APVD lathe. The preform 60 is placed on vertically adjustable positioning wheel supports 63A and 63B. The purpose of the process is to fuse the handle rods 62A, 62B to both ends of the preform 60, to support the multicore preform on the spindles of the APVD lathe. The classical set-up for a preform consists in rotating it at a rotation speed between 30 and 40 rpm, depending on its diameter, and heating the junction point between the preform and the handle rod with a $O_2/H_2$ burner until the limit of welding point temperature (white colored heat point). When the preform starts to beat, due to instability of its diameter along length, the operator tries to reduce beating by slightly raising and/or lowering alternatively both wheels supports, until the preform is centered on the axis of rotation. Heating must be immediately stopped at this time.

For the non-circular preform 60 according to this embodiment, the process is improved by widely reducing the rotation speed to 15-16 rpm, and by:

Placing the wheels support 63A as close as possible to the junction between preform 60 and handle rod 62A, while taking care of burner 64;

Placing the wheels support 63B as close as possible to the tip of preform 60 (approximately 5 cm from the tip).

Once left-hand side tip of preform 60 is aligned with handle rod 62A, it is hence rotated at a rotation speed of 15 to 16 rpm around an axis of rotation aligned with the central axis of handle rods 62A, 62B. The $O_2/H_2$ burner 64 heats the junction zone between preform 60 and handle rod 62A until limit of welding point temperature. In case of beating, positioning wheels support 63A and 63B are vertically adjusted until the preform 60 is centered on the axis of rotation, and heating is then immediately stopped.

This special recipe of heating with very slow rotation and correct wheel support positioning during set-up of the preform allows to straighten the preform (i.e. reduce beating), despite its non-circularity resulting from the collapsing step.

It is also possible to place the burner 64 at another position along the preform length, to correct a local deformation of the preform 60.

Once both handle rods 62A, 62B are fused at both ends of the preform 60, a layer of silica is deposited around preform 60 (S3), using an APVD® process, which consists in using a very high temperature plasma torch. The APVD process (commonly known as plasma recharging) involves melting high-purity natural or synthetic quartz grains onto the primary preform using an inductive plasma torch. Preform 60 is rotated on the APVD lathe, so that silica is deposited uniformly around the outer surface of the preform.

In alternate embodiments, over-cladding step S3 may be performed using an Outside Vapor Deposition (OVD) process, or even sleeving the preform in a glass tube (in this latter case, an additional collapsing step must be performed).

This over-cladding step S3 is essential because it corrects preform circularity and diameter stability along length. It allows glass to be added in the desired quantity. Its parameters must be adjusted depending on preform final diameter.

According to this embodiment, preform 60 has been over-cladded to reach an outer diameter of 55 mm.

At step S4, part or all of the deposited silica layer at step S3 and, optionally part or all of tube 40 are removed. Preferentially, removing is carried out by evaporation performed on the APVD lathe, using the same plasma torch in the same temperature range as during over-cladding step S3, but without adding silica. Preform is rotated on the APVD lathe, and the plasma torch is displaced along its length, so as to perform uniform evaporation on its outer surface.

The outer diameter of the over-cladded preform is monitored during evaporation. At the end of an evaporation pass, a next evaporation pass can be set depending on the measured outer diameter. The outer diameter of the preform can thus be evened out over its entire length by passing the plasma torch over certain portions of the preform more quickly.

Several passes of the over-cladding and evaporation cycle can be set, depending on the final preform diameter that is targeted.

For example, according to this peculiar experimental embodiment, a complete over-cladding/evaporation cycle comprised:

A pre-heating phase, during which the plasma torch was translated at 85 mm/min, to limit evaporation. The collapsed stack was rotated at 41 rpm. Power of plasma torch was 110 KW.

Four deposition phases, with small correction to reach the targeted over-cladded diameter. During these deposition phases, translation speed of the plasma torch was 56 mm/min, rotation speed of the collapsed stack was between 36 and 38 rpm, with a power of 110 KW.

Three evaporation phases, with translation speed of the plasma torch between 26 and 28 mm/min, rotation speed of the preform around 18 rpm and power of 98 kW.

A correction phase (tapers) at translation speed 26 mm/min, rotation at 18 rpm and 98 kW power.

Last, an evaporation phase at translation speed 30 mm/min, rotation at 30 rpm, 90 kW power. According to this embodiment, the outer diameter of the collapsed stack was 43.5 mm, which had been over-cladded to 55 mm. Evaporation step S4 aims at producing a preform with outer diameter 42 mm, which implies evaporating at least part of tube 40. In alternate embodiments, tube 40 can be completely evaporated during step S4, which targets a final outer diameter and evaporates all silica in excess.

In alternate embodiments, the removing step S4 may be chemical etching, mechanical machining, high pressure water etching or high-power laser etching to remove any silica in excess.

Figure 7:
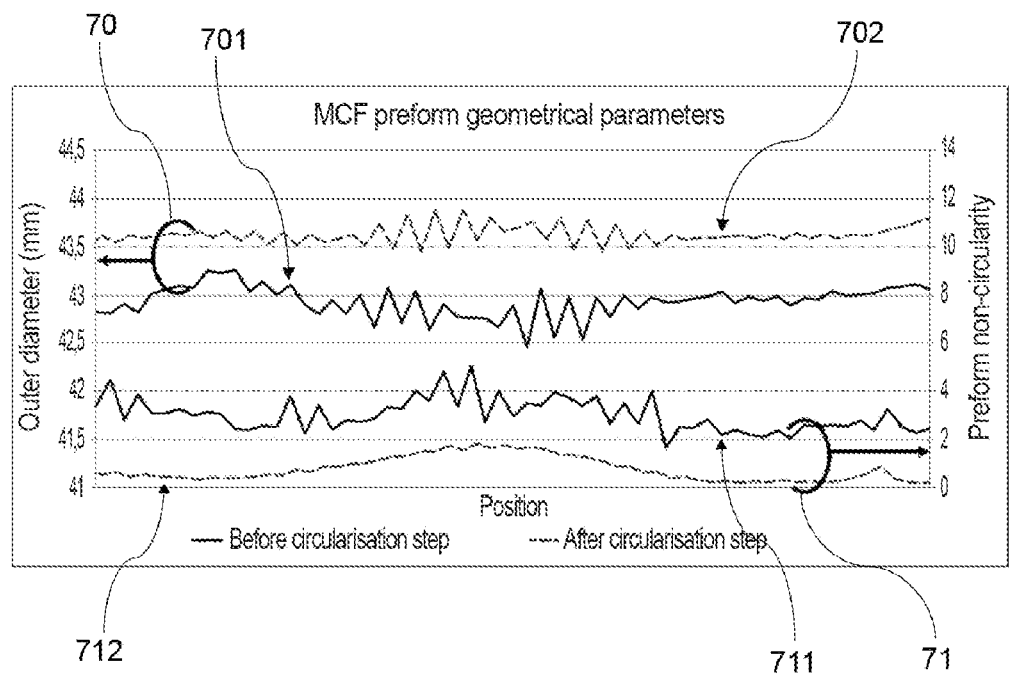
FIG. 7 shows the multicore preform geometrical parameters according to this embodiment.

FIG. 7 shows the multicore preform geometrical parameters (referred to as "MCF" geometrical parameters within FIG. 7) according to this embodiment.

The upper set of curves 70 shows the preform's outer diameter, expressed in mm. The lower set of curves 71 shows the preform non-circularity. Non-circularity is defined as outer diameter variations while rotating along longitudinal axis.

Curves 701 and 711 correspond to the preform geometrical properties, as measured after collapsing step S2. Curves 702 and 712 correspond to the preform geometrical properties, as measured at the end of the over-cladding S3 and evaporating S4 cycle.

As mentioned above, the multicore preform outer diameter after collapse is ca. 43 mm (see curve 701). The preform has then been over-cladded to reach a 55 mm-outer diameter at step S3, and a part of the preform has been evaporated at step S4 to reach an outer diameter of ca. 43.5 mm (see curve 702).

As may be observed by comparing curves 711 and 712 (before circularisation step and after circularisation step respectively, preform non-circularity is strongly reduced after the over-cladding/evaporation cycle.

Moreover, as may be observed by comparing curves 701 and 702, preform outer diameter is more stable along length after the over-cladding/evaporation cycle, and beating has been suppressed. According to this embodiment, core-to-core distance target on fiber is 37 µm, stack dimensions have been calculated according to a final outer diameter of 43.5 mm that has been achieved thanks to the over-cladding/evaporation step.

Thanks to the over-cladding and evaporating cycle, it is possible to form a preform with a targeted outer diameter, while starting from a tube 40 with reduced thickness, as compared to the prior art manufacturing techniques. It is hence possible to get rid of the constraints on the core-to-core distances, which resulted from the tube thickness. Tubes 40 with thickness ranging from 2 to 15 mm may be used.

Figure 8:
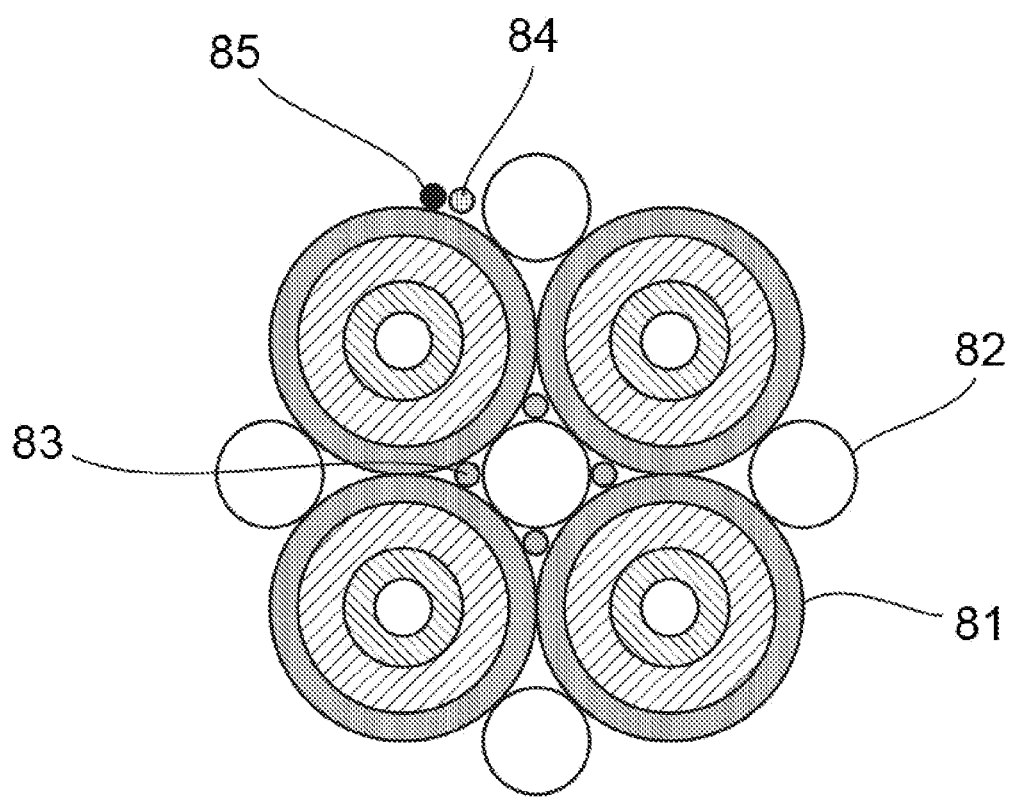
FIG. 8 shows the relative arrangement of core rods and silica-based filler rods forming the stack according to another embodiment.

FIG. 8 shows a cross-sectional view of a stack of rods according to another embodiment. In the stack of FIG. 8, as compared to FIG. 4, there are more filling rods, with different outer diameters, as well as a peculiar filler rod acting as a marker.

More precisely, the stack of FIG. 8 comprises four core-rods 81, arranged according to a square pattern, like in FIG. 4. However, the five filler rods 82 with outer diameter 5.1 mm have been completed with four pure silica rods 83 with outer diameter 1.55 mm, located in the center part of the stack, around the central filler rod 82.

Moreover, a F-doped silica rod 85 with outer diameter 1.5 mm serves as a marker. Pure silica rod 84 with outer diameter 1.5 mm aims at adjusting the positioning of marker 85 with respect to the center of the preform, as well as its angular position.

This manufacturing process provided very interesting results, but may be further improved to produce preforms with a greater outer diameter, which will increase the number of kilometers of multicore fibers that can be produced from the preform at drawing step S5. Production costs would be lowered.

More generally, embodiments of the manufacturing process allowed targeting final outer diameters of the preform in the range of 40 to 44 mm. But using a tube 40 with higher diameter to make the stack would allow producing preforms with higher outer diameters (100 mm, 150 mm or even 200 mm), and of ca. 1 m length.

In this case, dimensions of the elements of FIG. 8 above become:

TABLE 1

|  | Min. Parameter | Max. Parameter |
| --- | --- | --- |
| MC-preform diameter | 100 mm | 200 mm |
| Core rod 81 diameter | 32 mm | 64 mm |
| Silica rod 82 diameter | 12 mm | 24 mm |
| Silica rods 83-84-85 diameter | 4 mm | 8 mm |

These dimensions are indicative.

Using a bigger tube 40, in order to manufacture a preform with an outer diameter of 100 mm or 200 mm, makes it possible to dispense with preliminary stretching step PS2 and PS3 in FIG. 5. Actually, core rods 201 with outer diameter of e.g. 39 mm and pure silica rods with outer diameter of e.g. 30 mm can be directly stacked and inserted into tube 40.

Once the over-cladding S3/evaporating S4 cycle is completed, the circular preform is placed in a draw furnace where it is heated. A multi-core optical fiber may be drawn (step S5) from the multi-core preform. The draw furnace is generally vertically oriented such that multi-core optical fiber drawn from the preform exits the furnace along a substantially vertical pathway. After it exists the draw furnace, its dimensions and the draw tension applied to it are measured with non-contact sensors. It then passes through a cooling system which cools the multi-core optical fiber to less than 60° C.-80° C. The multi-core fiber then enters a coating system in which an optical coating layer is applied to its outer surface. As the multi-core optical fiber exits the coating system, its dimensions are measured again using another non-contact sensor. A non-contact flaw detector may also be used to examine the multi-core optical fiber for damage and/or flaws that may have occurred during manufacturing. Various drawing mechanisms and pulleys are used to provide the necessary tension to the multi-core optical fiber as it is drawn through the system and wound onto a storage pool.

The invention claimed is:

1. A method for manufacturing a preform for a multicore fiber, comprising:
    (a) stacking (S1) a plurality of core rods and a plurality of silica-based filler rods in a tube, forming a stack of rods;
    (b) collapsing the tube around the stack of rods, forming a collapsed stack;
    (c) depositing a layer of silica around the collapsed stack thereby forming the preform for the multicore fiber having an initial circularity; and
    (d) after step (c), removing at least part of the deposited layer of silica thereby increasing circularity and diameter stability of the preform for the multicore fiber along its length when compared with the initial circularity of the preform for multicore fiber formed in step (c).

2. The method for manufacturing a preform for a multicore fiber according to claim 1, further comprising removing at least part of the tube.

3. The method for manufacturing a preform for a multicore fiber according to claim 1, wherein collapsing (S2) the tube around the stack of rods comprises:
    cleaning the stack and inner part of the tube using $SF_6$;
    heating the cleaned tube at a temperature comprised between 1500° C. and 2000° C.; and
    closing the tube from one end to the other.

4. The method for manufacturing a preform for a multicore fiber according to claim 1, wherein depositing (S3) a layer of silica around the collapsed stack is achieved using a process comprising at least one of:
    a plasma vapor deposition process;
    an Outside Vapor Deposition (OVD) process; or
    sleeving the collapsed stack with a silica glass tube.

5. The method for manufacturing a preform for a multicore fiber according to claim 1, wherein removing (S4) at least part of the deposited layer of silica is achieved using a process belonging to the group comprising at least one of:
    Evaporating with a plasma torch;
    Chemical etching;
    Mechanical machining;
    water etching; or
    laser etching.

6. The method for manufacturing a preform for a multicore fiber according to claim 4, wherein, prior to depositing a layer of silica around the collapsed stack, further comprising a step for set-up of the collapsed stack on a lathe, comprising:
    placing two horizontally aligned handle rods within mandrels of the lathe; placing the collapsed stack on vertically adjustable positioning wheel supports such that each vertically adjustable wheel support is closer to one end of the collapsed stack than to another end;
    aligning a first end of the collapsed stack with a first handle rod;
    rotating the collapsed stack at a rotation speed of 15 to 16 rpm around an axis of rotation aligned with the central axis of said handle rods;
    heating the first end of the collapsed stack in contact with the first handle rod with an $O_2/H_2$ burner until welding point temperature limit is reached;
    vertically adjusting positioning wheels of the vertically adjustable positioning wheel supports until the collapsed stack is centered on said axis of rotation, and stopping the heating.

7. The method for manufacturing a preform for a multicore fiber according to claim 1, wherein the plurality of core rods comprises 2 to 20 core rods.

8. The method for manufacturing a preform for a multicore fiber according to claim 1, wherein each core is either single-mode, few-mode or multimode.

9. The method for manufacturing a preform for a multicore fiber according to claim 1, wherein the plurality of silica-based filler rods comprises at least two types of pure silica rods with distinct outer diameters.

10. The method for manufacturing a preform for a multicore fiber according to claim 1, wherein the plurality of silica-based filler rods comprises one silica rod doped with fluorine, forming a marker rod.

11. A method for manufacturing a multicore fiber comprising manufacturing a preform for a multicore fiber according to claim 1 followed by a drawing process (S5) for drawing the preform for the multicore fiber.

12. The method for manufacturing a multicore fiber according to claim 11, further controlling pressure of the preform while drawing the preform.

13. A method for manufacturing a preform for a multicore fiber, comprising:
    (a) stacking (S1) a plurality of core rods and a plurality of silica-based filler rods in a tube, forming a stack of rods;
    (b) collapsing the tube around the stack of rods, forming a collapsed stack;
    (c) depositing a layer of silica around the collapsed stack thereby forming the preform for the multicore fiber having an initial circularity; and
    (d) after step (c), removing at least part of the deposited layer of silica thereby increasing circularity and diameter stability of the preform for the multicore fiber along its length when compared with the initial circularity of the preform for multicore fiber formed in step (c), wherein depositing (S3) a layer of silica around the collapsed stack is achieved using a process comprising at least one of:
    a plasma vapor deposition process;
    an Outside Vapor Deposition (OVD) process; or
    sleeving the collapsed stack with a silica glass tube, and
    wherein, prior to depositing a layer of silica around the collapsed stack, further comprising a step for set-up of the collapsed stack on a lathe, comprising:
        placing two horizontally aligned handle rods within mandrels of the lathe;
        placing the collapsed stack on vertically adjustable positioning wheel supports such that each vertically adjustable wheel support is closer to one end of the collapsed stack than to another end;
        aligning a first end of the collapsed stack with a first handle rod;
        rotating the collapsed stack at a rotation speed of 15 to 16 rpm around an axis of rotation aligned with the central axis of said handle rods
        heating the first end of the collapsed stack in contact with the first handle rod with an $O_2/H_2$ burner until a welding point temperature limit is reached;

vertically adjusting positioning wheels of the vertically adjustable positioning wheel supports until the collapsed stack is centered on said axis of rotation, and
stopping the heating.

* * * * *